United States Patent [19]

Vieau et al.

[11] 4,243,864
[45] Jan. 6, 1981

[54] MULTIPLE WIRE ELECTRODE FEED MECHANISM FOR ELECTROEROSION MACHINE

[76] Inventors: Richard R. Vieau, 314 S. Emerson, Itasca, Ill. 60143; Robert A. Vieau, 315 E. Berkshire, Roselle, Ill. 60172

[21] Appl. No.: 3,115

[22] Filed: Jan. 15, 1979

[51] Int. Cl.³ .............................................. B23P 1/02
[52] U.S. Cl. .............................................. 219/69 W
[58] Field of Search ............... 219/69 W, 69 E, 69 M; 204/129.1

[56] References Cited

U.S. PATENT DOCUMENTS

| | | | |
|---|---|---|---|
| 3,987,270 | 10/1976 | Ullmann et al. | 219/69 W |
| 4,084,024 | 4/1978 | Gilleland et al. | 219/69 W |
| 4,103,137 | 7/1978 | Levitt et al. | 219/69 W |
| 4,193,852 | 3/1980 | Inoue | 219/69 W |

FOREIGN PATENT DOCUMENTS 43939 11/1963 German Democratic Rep. ... 219/69 E

Primary Examiner—C. C. Shaw

[57] ABSTRACT

The subject invention relates to an electroerosion machine which utilizes a plurality of moving wires for cutting a metal workpiece by means of an electrical discharge between each of the wires and the workpiece. The machine includes a frame, and a table is mounted on the frame for carrying the workpiece. The machine also includes an electrical system. Each of the wires of the plurality of moving wires is an electrically conductive wire which is wound on a respective supply spool. Each of the wires from a respective spool is connected to a tension assembly. The wires are then directed from the tension assembly to a cutting guide assembly. At the cutting guide assembly, the wires are positioned proximate to the workpiece and there is an electrical discharge between the wires and the workpiece to erode the workpiece. A take-up assembly takes the wires from the cutting guide assembly for storage of the wires.

12 Claims, 5 Drawing Figures

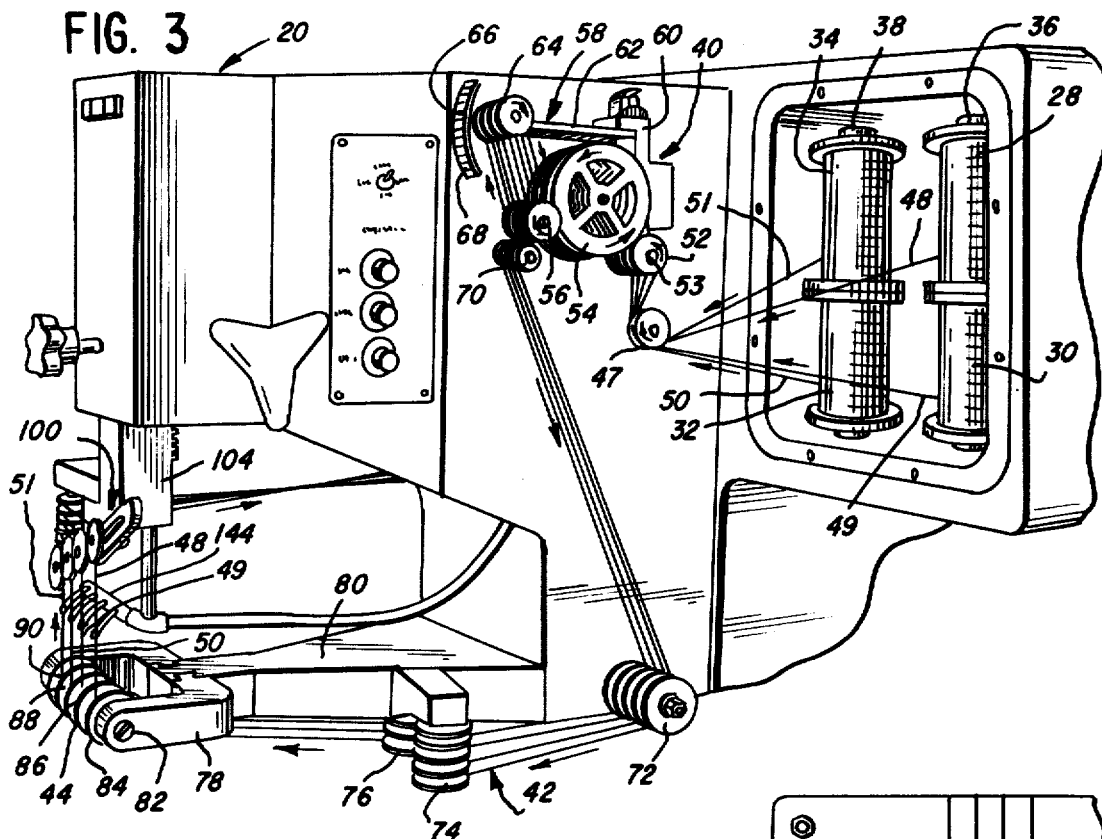
FIG. 3
FIG. 4
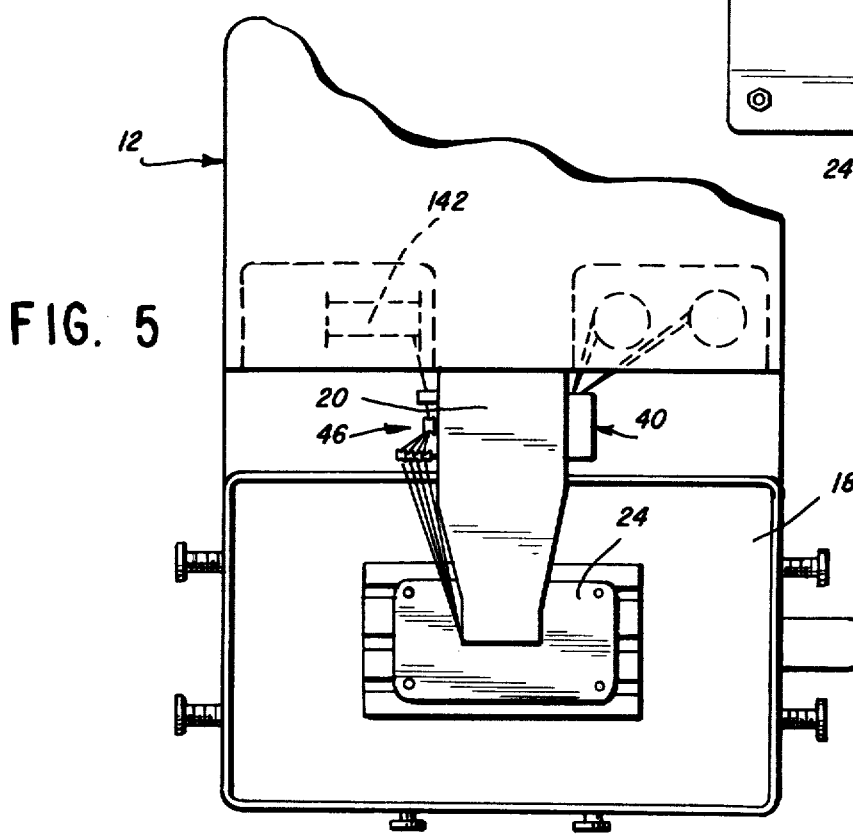
FIG. 5

MULTIPLE WIRE ELECTRODE FEED MECHANISM FOR ELECTROEROSION MACHINE

BACKGROUND OF THE INVENTION

Electroerosion of metal parts is generally well known. There are two different basic types of machines for electroerosion. In one of the types of machine, a wire electrode is placed with one end adjacent to a workpiece. The wire electrode is used up in the process of electroerosion. Machines of this type are shown in a number of U.S. Letters Patents, and typical are: U.S. Letters Pat. No. 3,604,883 to Dietz entitled MULTIPLE ELECTRODE ASSEMBLY FOR ELECTRICAL DISCHARGE MACHINING; U.S. Letters Pat. No. 4,041,269 to Baker for CARTRIDGE FOR AN ELECTRICAL DISCHARGE MACHINING APPARATUS, and U.S. Letters Pat. No. 4,044,216 to Check el at for MULTIPLE ELECTRODE ELECTRICAL DISCHARGE MACHINING. Each of the foregoing disclosures teaches multiple wire electrodes.

On the other hand, the other type of machine has a continuous wire which moves pass the workpiece during the electroerosion, and the wire is not used up, but rather is collected.

Typical disclosures of various machines which have a moving continuous wire are contained in: U.S. Letters Pat. No. 3,822,374 to Ullmann, et al entitled ELECTRODE WIRE FEED MECHANISM FOR ELECTRO-EROSION MACHINES; U.S. Letters Pat. No. 3,849,624 to Dulebohn, et al entitled WIRE ELECTRODE ELECTRIC EROSION DEVICE; U.S. Letters Pat. No. 3,946,189 to Pomella, et al entitled ELECTROEROSION APPARATUS HAVING A CYCLICALLY MOVABLE AND VARIABLY INCLINED WIRE ELECTRODE; U.S. Letters Pat. No. 3,987,270 to Ulmann, et al entitled AUTOMATIC SET-UP ELECTROEROSION MACHINING METHOD AND APPARATUS; U.S. Letters Pat. No. 4,002,885 to Bell, Jr., et al entitled SERVO FEED SYSTEM FOR A WIRE ELECTRODE TYPE ELECTRICAL DISCHARGE MACHINING APPARATUS; U.S. Letters Pat. No. 4,016,395 to Rietveld entitled WIRE ELECTRODE FEED SYSTEM FOR ELECTRICAL DISCHARGE MACHINING; U.S. Letters Pat. No. 4,029,929 to Rietveld entitled ELECTRICAL DISCHARGE MACHINING DEVICE FOR CUTTING WITH WIRE ELECTRODE; U.S. Letters Pat. No. 4,052,583 to Inoue entitled METHOD OF AND APPARATUS FOR ELECTRICAL DISCHARGE MACHINING WITH A TRAVELING-WIRE ELECTRODE and U.S. Letters Pat. No. 4,084,074 to Gilleland, et al entitled WIRE ELECTRODE PROTECTION SYSTEM FOR ELECTRICAL DISCHARGE MACHINING. This second group of patents which relate to non-destruction of wire electrode electroerosion machines do not disclose any multiple wire electroerosion machines.

Although the use of multiple wire electrodes is well known in the art for use in electrodes, wherein the electrodes are consumed, the use of multiple electrodes has not been heretofore successfully used in systems, wherein the wire moves past the workpiece and is not consumed.

It has been found that the utilization of multiple electrodes in the non-consuming systems has been most difficult. Some of the problems which have been encountered is that the wire of one or more of the cutting wires break, or the cutting is erratic, that is, the cut is not true.

It is desirable to make multiple cuts with a single electroerosion machine to reduce the machining time of like parts.

SUMMARY OF THE INVENTION

The present invention relates to an improvement in an electroerosion machine of the general type, wherein an electrode wire is moved passed the workpiece, and the wire is not consumed in the process. Electroerosion machines are well known. Most of these machines include, a frame with a movable table mounted on the frame. Ordinarily, the table is controlled by a computer control to move a workpiece mounted on the table past a moving electrode wire. The subject machine includes an electrical system for creating an electrical discharge between the wire and the workpiece, which thereby erodes the workpiece. The improvement of the subject invention lies in providing a plurality of supply spools of electrically conductive wire. Each of the spools provides a wire to a tension assembly from which the wire is delivered to a cutting guide assembly. The cutting guide assembly holds the wires parallel to each other, so that the table carrying a workpiece past the wires receives multiple cuts. The wires are taken up by a take-up assembly from the cutting guide assembly. At the take-up assembly, the wires are wound onto a single take-up spool.

BRIEF DESCRIPTION OF THE DRAWINGS

FIG. 3 is an enlarged perspective view of the other side of that portion of the cutting machine shown in FIG. 2, but with the workpiece removed showing a plurality of wires being delivered from respective supply spools through a tension assembly to the cutting guide assembly;

FIG. 4 is an enlarged fragmentary plan view of the workpiece of FIG. 1; and

FIG. 5 is an enlarged fragmentary plan view of the head of the machine shown in FIGS. 2 and 3.

DESCRIPTION OF THE PREFERRED EMBODIMENT

Figure 1:
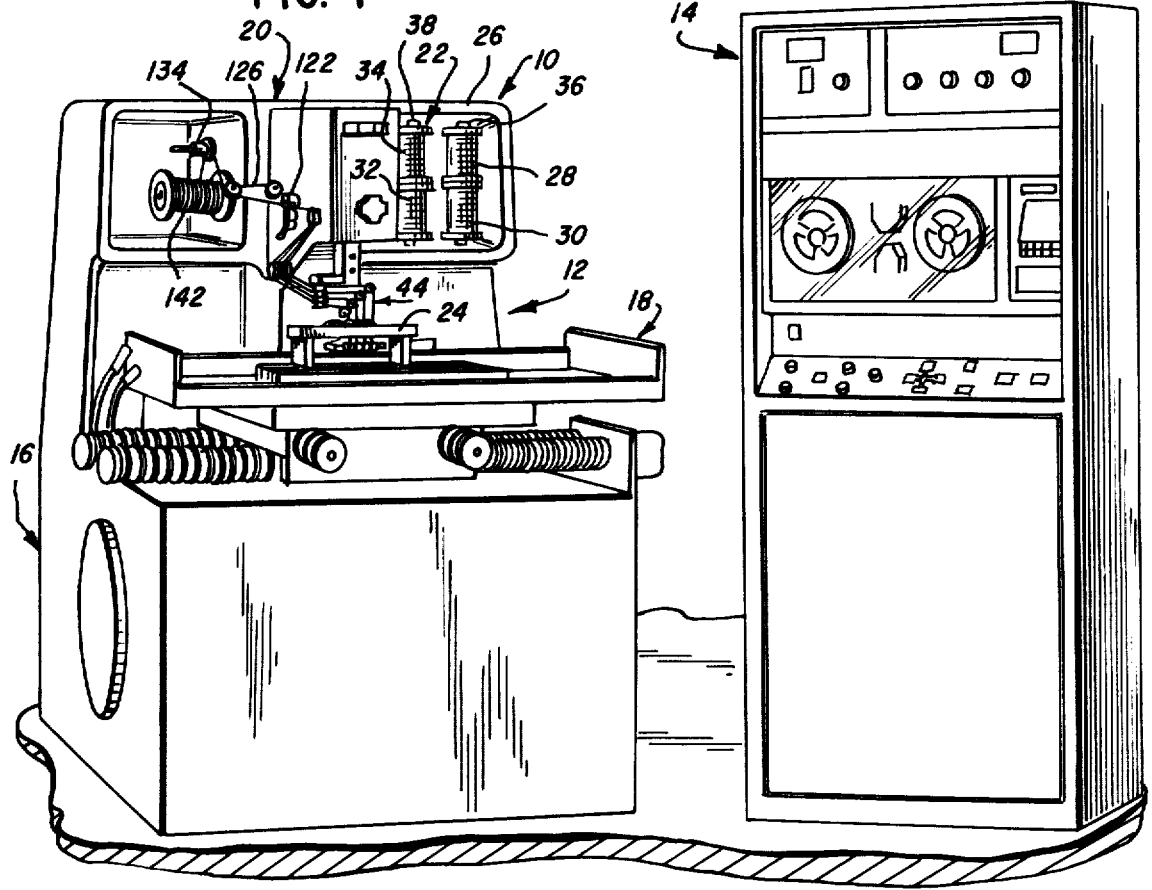
FIG. 1 is a perspective view of an electroerosion machine which is a specific embodiment of the present invention, the machine includes a cutting machine and a computer for controlling a table of the cutting machine, which table carrys a workpiece.

Referring now to the drawings and especially to FIG. 1, an electroerosion machine embodying the herein disclosed invention is generally indicated by numeral 10. Electroerosion machine 10 generally includes a cutting machine 12 and a conventional computer 14 which controls cutting machine 12. Cutting machine 12 generally includes a frame 16 having a table 18 mounted on frame 16. Table 18 is controlled by computer 14, as is conventional. The frame includes a head 20 which carries a cutting apparatus. A multiple wire feed 22 is mounted on the head.

Figure 2:
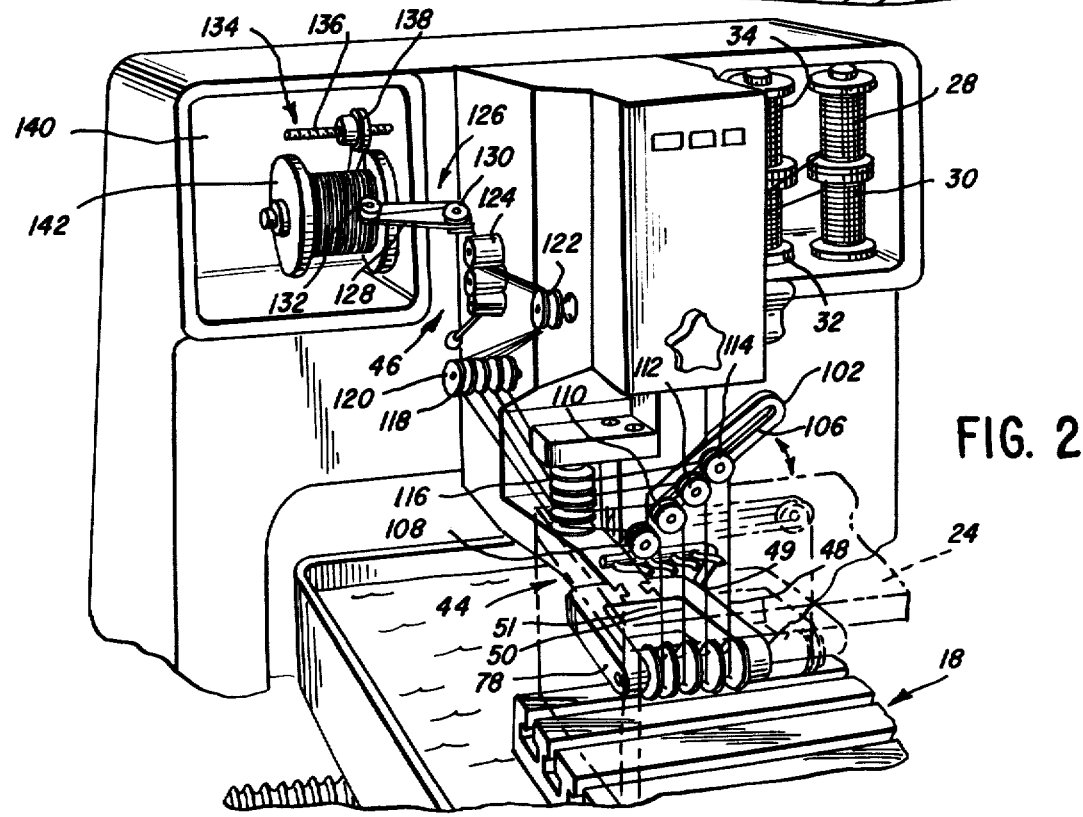
FIG. 2 is an enlarged perspective view of one side of a portion of the cutting machine of FIG. 1 showing a plurality of conductive wires in a cutting guide assembly, a take-up assembly receiving the wires from the cutting guide assembly, and a single workpiece is shown in phanthom view.

Referring now to FIGS. 2 and 3, the multiple wire feed 22 is shown therein. Head 20 includes a supply spool bin 26, which in this instance has four supply spools 28, 30,32 and 34 rotatably mounted therein. Spools 28 and 30 are mounted on axle 36 and spools 32 and 34 are mounted on an axle 38. Each of the supply spools delivers a single copper wire to a tension assembly 40 as may be best seen in FIG. 3. The wires then pass into a delivery assembly 42 and to a cutting guide assembly 44. The wires are taken up from the cutting guide assembly by a take-up assembly 46, which is best seen in FIG. 2.

As may be seen in FIG. 3, the tension assembly 40 includes an input sheave 47, which receives four wires 48, 49, 50 and 51 from spools 28, 30, 32 and 34 respectively. The wires then engage spreader sheaves 52, which sheaves 52 are rotatably mounted on a spreader sheave axle 53. There are four spreader sheaves 52, each of which receives one of the four wires. The wires then pass to four wheels 54, which wheels 54 are rotatably mounted on the head. Four take off sheaves 56 are rotatably mounted on the head adjacent to respective wheels 54. The wires then pass to a resilient support assembly 58.

Resilient support assembly 58 includes an arm base 60 fixed to the head. Four identical resilient cantilever arms 62 are mounted in the arm base. A tension sheave 64 is mounted on the free end of each of the cantilever arms 62. A pointer 66 is mounted on arm 62, adjacent to the head. A dial 68 is mounted on the head cooperative with pointer 66 to provide an indicia of tension applied to the wires. The wires pass from tension sheaves 64 to take-up sheaves 56, to four discharge sheaves 70, which discharge sheaves are rotatably mounted on the head.

Delivery assembly 42 includes four side sheaves 72 which are rotatably mounted on the head and receive the four wires from the four discharge sheaves 70 of tension assembly 40. Four transfer sheaves 74 are rotatably mounted on the head and receive the four wires from side sheaves 72. Each of the wires from the transfer sheaves is delivered to an alignment sheave 76.

Cutting guide assembly 44 includes an input guide yoke 78, which is mounted on a yoke arm 80. The yoke arm is fixed to the head. An input guide rod 82 is mounted in yoke 78 and has four identical input guides 84, 86, 88 and 90 mounted thereon. The input guides 84, 86, 88 and 90 receive wires 48, 49, 50 and 51 respectively. Wires 48, 49, 50 and 51 are held parallel to each other by a discharge guide support 100, and input guides 84, 86, 88 and 90. The discharge guide support 100 includes a guide support arm 102, which arm 102 is pivotally mounted on a column 104 of the head. The arm 102 has a slot 106 formed therein. Four guide sheaves 108, 110, 112 and 114 are rotatably mounted on arm 102. The guide sheaves 108, 110, 112 and 114 receive the wires 51, 50, 49 and 48 respectively and act as discharge guides for the wires. Sheaves 108, 110, 112 and 114 cooperate with the guides 90, 88, 86 and 84 respectively to keep the wires 51, 50, 49 and 48 parallel to each other between the respective guide sheaves and guides. The wires are also held perpendicular to workpiece 24, which is mounted on table 18. The spacing between the guides 84, 86, 88 and 90 may be adjusted for a given job. In order to maintain the wires parallel, arm 102 is pivoted to adjust the spacing between the guide sheaves to be equal to the spacing between the guides. The wires then engage four corner sheaves 116 which are rotatably mounted on the head.

Wires 48, 49, 50 and 51 travel from corner sheaves 116 to take-up assembly 46. The take-up assembly includes four identical take-up guides 118 rotatably mounted on a take-up axle 120. The take-up guides 120 receive the four wires, and the four wires are then joined at a common take-up sheave 122. The wires then pass through take-up rollers 124 and to a spacer 126. The spacer 126 includes a spacer arm 128 which is mounted in cantilever fashion on the head. A spacer sheave 130 is mounted on arm 128 adjacent to the head to receive the four wires which are joined. The wires then engage a free end sheave 132. The four joined wires then engage a level winder assembly 134.

Level winder assembly 134 includes a double threaded rod 136 with winder sheave 138 mounted thereon. The head includes a take-up spool bin 140. A take-up spool 142 is mounted in bin 140 and the take-up spool receives the joined wire from winder sheave 138. The take-up spool is power driven by an electric motor, which is not shown herein. The take-up spool pulls the four wires from the supply spools past the workpiece and then winds up the wires for storage.

The instant electroerosion machine operates in a conventional fashion, in that workpiece 24 is mounted on table 18. If it is necessary to thread through the workpiece, the workpiece is drilled and then the wires are threaded. Workpiece 24, which is shown in FIG. 4, is shown with four cuts starting from an edge. Computer 14 controls movement of table 18 in a horizontal plane as is conventional, and is well known in the art. Workpiece 24 is moved relative to wires 48, 49, 50 and 51, which are parallel to each other and are perpendicular to the workpiece. As the workpiece moves relative to the wires, the workpiece is cut by electroerosion. It may be appreciated that inasmuch as the wires are parallel to each other, and are perpendicular to the workpiece, the workpiece has four simultaneous identical cuts made in the workpiece. While the cuts are being made, demineralized water is supplied to the workpiece from water nozzle 144 which is connected to a source of demineralized water. The addition of demineralized water to the gap forming the cut in the workpiece and the wire is conventional and well known.

The wires 48, 49, 50 and 51 are continually fed through the cutting guide assembly. Supply spools 28, 30, 32 and 34 provide individual wires which are delivered to the tension assembly 40. The wires pass through the cutting assembly 44 and are then taken up on take-up spool 142 of take-up assembly 46. It is important to note that the take-up spool 142 is driven and the wires are wound thereon simultaneously. The wires are pulled through the cutting guide assembly and the tension on the wires is regulated by tension assembly 40. Tension sheaves 64 are mounted on the resilient cantilever arms 62, so that the tension of the wire is relatively constant and the tension on each wire is substantially the same. Accordingly the wires pass through the cutting guide assembly at a uniform rate.

When all of the wire has been removed from spools 28, 30, 32 and 34 and the wires are wound up on the take-up spool 142, the take-up spool is then removed from the head and is salvaged by a well known salvage operation. Fresh spools are mounted on the axles 36 and 38, and the wires from the spools are threaded through the tension assembly, cutting guide assembly and to the take-up spool 142, as described above.

Although a specific embodiment of the herein disclosed invention has been set forth in detail above and shown in the accompanying drawings, it is to be understood that those skilled in the art may make various modifications and changes in a device embodying the present invention without departing from the spirit and scope of the instant invention. It is to be expressly understood that the herein disclosed invention is limited only by the appended claims.

What is claimed is:

1. In an electroerosion machine which cuts a metal by means of electrical discharge between an electrically conductive wire and metal, said machine having a frame, a table for carrying metal movably mounted on the frame, a head mounted on the frame, and an electrical system connected to the electrically conductive wire and the metal, the improvement comprising; a plurality of supply spools of electrically conductive wire, each of said supply spools having a wire continuously removed therefrom, a tension assembly receiving a wire from each of the supply spools, a cutting guide assembly receiving each of said wires and holding the wires parallel to each other adjacent to the metal while there is electrical discharge between each of the wires and the metal, and a take-up assembly receiving the wires from the cutting guide assembly.

2. In an electroerosion machine of the character described as defined in claim 1 wherein, the tension assembly includes; an input sheave receiving the wires from the supply spools, a plurality of spreader sheaves equal in number to the number of wires, each of the spreader sheaves receiving one of the wires, and a plurality of tension sheaves movably and resiliently supported and being equal in number to the number of wires, each of said tension sheaves receiving one of the wires, whereby the tension sheaves keep the wires in the cutting guide assembly at a relatively uniform tension.

3. In an electroerosion machine of the character described as defined in claim 1 wherein, the cutting guide assembly includes; a plurality of input guides spaced from each other and being equal in number to the number of wires, each of said input guides receiving one of said wires, a discharge guide support pivotally mounted on the head, and a plurality of discharge guides equal in number to the number of wires mounted on the discharge guide support, said discharge guide support being pivotally positionable to align each discharge support with its respective input guide to receive a respective wire from the input guide and hold the wire parallel to the other wires between their respective input and discharge guides.

4. In an electroerosion machine of the character described as defined in claim 1 wherein, the take-up assembly includes; a plurality of spaced take-up guides equal in number to the number of wires, each of said take-up guides receiving one of said wires, a take-up sheave receiving the wires from the take-up guides, and a take-up spool windingly receiving the wires from the take-up sheave.

5. In an electroerosion machine of the character described as defined in claim 1 wherein, the cutting guide assembly includes; a plurality of input guides spaced from each other and being equal in number to the number of wires, each of said input guides receiving one of said wires, and a plurality of discharge guides equal in number to the number of wires, each of said discharge guides being positioned relative to a respective input guide to receive the wire from the input guide and hold the wire parallel to the other wires between their respective input and discharge guides.

6. In an electroerosion machine of the character described as defined in claim 1 wherein, the tension assembly includes; an input sheave receiving the wires from the supply spools, a plurality of spreader sheaves equal in number to the number of wires, each of the spreader sheaves receiving one of said wires, and a plurality of tension sheaves movably and resiliently supported and being equal in number to the number of wires, each of tension sheaves receiving one of the wires, whereby the tension sheaves keep the wires in the cutting guide assembly at a relatively uniform tension; and the cutting guide assembly includes; a plurality of input guides spaced from each other and being equal in number to the number of wires, each of said input guides receiving a wire, a discharge guide support pivotally mounted on the head, and a plurality of discharge guides equal in number to the number of wires mounted on the discharge guide support, said discharge guide support being pivotally positionable to align each discharge guide with its respective input guide to receive the wire from the input guide and hold its respective wire parallel to the other wires between their respective input and discharge guides.

7. In an electroerosion machine of the character described as defined in claim 1 wherein, the cutting guide assembly includes; a plurality of input guides spaced from each other and being equal in number to the number of wires, each of said input guides receiving one of said wires, and a plurality of discharge guides equal in number to the number of wires, each of said discharge guides being positioned relative to a respective input guide to receive the wire from the respective input guide and hold the wire parallel to the other wires between their respective input and discharge guides; and the take-up assembly includes; a plurality of spaced take-up guides equal in number to the number of wires, each of said take-up guides receiving one of said wires, a take-up sheave receiving the wires from the take-up guide, and a take-up spool windingly receiving the wires from the take-up sheave.

8. In an electroerosion machine of the character described as defined in claim 1 wherein, the tension assembly includes; an input sheave receiving the wires from the supply spools, a plurality of spreader sheaves equal in number to the number of wires, each of the spreader sheaves receiving one of said wires, and a plurality of tension sheaves movably and resiliently supported and being equal in number to the number of wires, each of said tension sheaves receiving one of the wires whereby the tension sheaves keep the wire in the cutting guide assembly at a relatively uniform tension; and the take-up assembly includes; a plurality of spaced take-up guides equal in number to the number of wires, each of said take-up guides receiving one of said wires, a take-up sheave receiving the wires from the take-up guides, and a take-up spool windingly receiving the wires from the take-up sheave.

9. In an electroerosion machine of the character described as defined in claim 1 wherein, the tension assembly includes; an input sheave receiving the wires from the supply spools, a plurality of spreader sheaves equal in number to the number of wires, each of the spreader sheaves receiving one of the wires, and a plurality of tension sheaves movably and resiliently supported and being equal in number to the number of wires, each of said tension sheaves receiving one of the wires, whereby the tension sheaves keep the wires in the cutting guide assembly at a relatively uniform tension; and the cutting guide assembly includes; a plurality of input guides spaced from each other and being equal in number to the number of wires, each of said input guides receiving one of said wires, and a plurality of discharge guides equal of number to the number of wires, each of said discharge guides being positioned relative to a respective input guide to receive the wire from the input guide and hold the wire parallel to the other wires between their respective input and discharge guides.

10. In an electroerosion machine of the character described as defined in claim 1 wherein, the cutting guide assembly includes; a plurality of input guides spaced from each other and being equal in number to the number of wires, each of said input guides receiving one of said wires, a discharge guide support pivotally mounted on the head, and a plurality of discharge guides equal in number to the number of wires mounted on the discharge guide support, said discharge guide support being pivotally positionable to align each discharge guide with its respective input guide to receive the wire from the input guide and hold the respective wire parallel to the other wires between their respective input and discharge guides; and the take-up assembly includes; a plurality of spaced take-up guides equal of number to the number of wires, each of said take-up guides receiving one of said wires, a take-up sheave receiving the wires from the take-up guides, and the take-up spool windingly receiving the wires from the take-up sheave.

11. In an electroerosion machine of the character described as defined in claim 1 wherein, the tension assembly includes; an input sheave receiving the wires from the supply spools, a plurality of spreader sheaves equal in number to the number of wires, each of the spreader sheaves receiving one of the respective wires, a plurality of tension sheaves movably and resiliently supported and being equal in number to the number of wires, each of said tension sheaves receiving one of the wires, whereby the tension sheaves keep the wires in the cutting guide assembly at a relatively uniform tension; the cutting guide assembly includes; a plurality of input guides spaced from each other and being equal in number to the number of wires, each of said input guides receiving a wire, and a plurality of discharge guides equal in number to the number of wires, each of said discharge guides being positioned relative to a respective input guide to receive the wire from the input guide and hold the respective wire parallel to the other wires between their respective input and discharge guides; and said take-up assembly includes; a plurality of spaced take-up guides equal in number to the number of wires, each of said take-up guides receiving one of said wires, a take-up sheave receiving the wires from the take-up guides, and a take-up spool windingly receiving the wires from the take-up sheave.

12. In an electroerosion machine which makes a cut in a metal workpiece by means of electrical discharge between an electrically conductive wire and the workpiece, said machine having a frame, a table for carrying the workpiece movably mounted on the frame, a head mounted on the frame, an electrical control system for creating a discharge between an electrically conductive wire and a workpiece, and a control system for moving the table relative to electrically conductive wire, the improvement comprising; a plurality of supply spools of electrically conductive wire rotatably mounted on the head, each of said supply spools providing a length of continuous electrically conductive wire, an input sheave rotatably mounted on the head and receiving the wires from the spools, a plurality of spreader sheaves equal in number to the number of wires from the supply spools rotatably mounted on the head, a plurality of wheels equal in number to the number of wires rotatably mounted on the head adjacent to the spreader sheaves, each of said wheels engaging one of said wires, a plurality of tension sheaves equal in number to the number of wires rotatably and resiliently mounted on the head, each of said tension sheaves receiving a respective wire, a delivery assembly receiving the wires from the tension sheaves, an input guide yoke mounted on the head, a plurality of input guides spaced from each other being equal in number to the number of wires mounted on the input guide yoke, a plurality of discharge guides mounted on the head and being equal in number to the number of wires, each of said discharge guides being aligned with a respective input guide to hold the respective wire between the input guide and the discharge guide parallel to the other wires held between their respective input guide and discharge guide, a plurality of take-up guides equal in number to the number of wires receiving the wires from the discharge guides, a take-up sheave mounted on the head receiving the plurality of wires from the take-up guides, a level winder assembly mounted on the head and receiving the plurality of wires from the take-up sheave, and a take-up spool mounted on the head and windingly receiving the plurality of wires from the lever winder assembly.

* * * * *